United States Patent
Siciak et al.

(10) Patent No.: US 9,630,503 B2
(45) Date of Patent: Apr. 25, 2017

(54) ENERGIZING AN AUTOMOTIVE VEHICLE HIGH VOLTAGE BUS USING A SINGLE MAIN CONTACTOR

(71) Applicant: FORD GLOBAL TECHNOLOGIES, LLC, Dearborn, MI (US)

(72) Inventors: Ray C. Siciak, Ann Arbor, MI (US); Vineeth S. Kallur, Novi, MI (US); Deborah E. Callicoat, Livonia, MI (US); Derek Hartl, Royal Oak, MI (US); Masahiro Kimoto, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 598 days.

(21) Appl. No.: 14/173,977

(22) Filed: Feb. 6, 2014

(65) Prior Publication Data
US 2015/0217642 A1     Aug. 6, 2015

(51) Int. Cl.
| H02G 3/00 | (2006.01) |
| B60L 3/00 | (2006.01) |
| B60L 3/04 | (2006.01) |
| B60L 15/22 | (2006.01) |

(52) U.S. Cl.
CPC ........... *B60L 3/0084* (2013.01); *B60L 3/04* (2013.01); *B60L 15/22* (2013.01); *B60L 2270/20* (2013.01); *Y02T 10/645* (2013.01); *Y02T 10/72* (2013.01); *Y02T 10/7275* (2013.01)

(58) Field of Classification Search
CPC ............ B60L 11/1838; B60L 11/1853; B60L 11/1859; B60L 11/1879; B60L 11/1881; B60L 11/1887; B60L 15/2009; B60L 2210/12; B60L 2230/12; B60L 2250/10
USPC ......................................................... 307/10.1
See application file for complete search history.

(56) References Cited

U.S. PATENT DOCUMENTS

| 4,153,128 | A | 5/1979 | Heitmeyer et al. |
| 5,369,540 | A | 11/1994 | Konrad et al. |
| 6,002,221 | A * | 12/1999 | Ochiai ................... B60L 3/0023 |
| | | | 318/139 |
| 6,597,072 | B2 * | 7/2003 | Yamazaki ........... B60L 11/1851 |
| | | | 307/9.1 |
| 6,768,621 | B2 | 7/2004 | Arnet et al. |
| 7,956,488 | B2 | 6/2011 | Kobayashi et al. |
| 8,049,585 | B2 | 11/2011 | Gonzales et al. |
| 8,803,486 | B2 * | 8/2014 | Norimatsu ............... H02M 1/36 |
| | | | 307/10.1 |

(Continued)

FOREIGN PATENT DOCUMENTS

JP     2006246569 A     9/2006

OTHER PUBLICATIONS

Richard W. Marks, The Converter's Guide to the Galaxy and EV Conversions, EnVironmental Transportation Solutions, LLC, rev. Dec. 15, 2008, pp. 1-116.

*Primary Examiner* — Jared Fureman
*Assistant Examiner* — Esayas Yeshaw
(74) *Attorney, Agent, or Firm* — David B. Kelley; MacMillan, Sobanski & Todd, LLC

(57) ABSTRACT

An automotive vehicle high voltage bus is connected to a power source by a circuit having a main contactor and a precharge contactor. To energize the bus, the precharge contactor is closed and then the main contactor is closed. Upon completion of precharging, the main contactor is opened and energization of the bus is complete.

18 Claims, 1 Drawing Sheet

(56) References Cited

U.S. PATENT DOCUMENTS

| | | | | |
|---|---|---|---|---|
| 2004/0026140 A1* | 2/2004 | Suzuki | ................... | B60K 6/485 180/65.26 |
| 2008/0185999 A1* | 8/2008 | Matsukawa | ........... | H02J 7/0077 320/166 |
| 2011/0043307 A1* | 2/2011 | Gonzales | ............ | B60R 16/0315 335/189 |
| 2014/0021916 A1* | 1/2014 | Bilezikjian | ........... | B60L 3/0046 320/109 |
| 2014/0046520 A1* | 2/2014 | Katoch | ................ | B60L 3/0046 701/22 |
| 2015/0084404 A1* | 3/2015 | Hashim | ................... | B60L 11/18 307/9.1 |
| 2015/0329006 A1* | 11/2015 | Burkman | .............. | B60L 11/123 307/10.7 |
| 2015/0346283 A1* | 12/2015 | Kwon | ................ | G01R 31/3662 702/63 |

\* cited by examiner

ENERGIZING AN AUTOMOTIVE VEHICLE HIGH VOLTAGE BUS USING A SINGLE MAIN CONTACTOR

BACKGROUND OF INVENTION

The present invention relates to energizing an automotive vehicle high voltage bus.

Electric automotive vehicles use high voltage electric traction motors to propel the wheels of the vehicle. The traction motors use a high voltage electrical power source, which is commonly in the form of a high voltage battery. Electrical power is fed to the traction motors from the power source via a high voltage electrical bus.

Typically, two main contactors are used to connect the high voltage electrical bus with the battery, one each in the positive and return leads. Under certain conditions, the high voltage battery is isolated, which is accomplished by opening the contactors. The possibility a main contactor will fail to open when needed increases as the contactors become worn. In order to address this concern, two contactors are used to reduce wear and tear on the contactors and to provide redundancy. Single contactors have been used for circuits where durability is not a concern, but such use is typically limited to low voltage situations, such as a maximum of 120 volts.

However, the use of two contactors in the high voltage bus disconnect circuit increases the complexity and cost of energizing high voltage buses over 150 volts. Known methods of producing high voltage contactors result in individual contactors lasting approximately 200,000 closing and opening cycles. At an average of 3.5 vehicle starts per day, then, a single contactor may last over 150 years.

SUMMARY OF INVENTION

An embodiment contemplates a method of energizing an automotive vehicle high voltage bus. A precharge contactor between a high voltage power source and a vehicle bus is closed without a main contactor being closed. Then, while the precharge contactor is kept closed, the main contactor is closed, the precharge and main contactors being in parallel. Upon completion of precharging, the precharge contactor is opened.

An advantage of an embodiment is improved energizing of the automotive vehicle's high voltage bus reduces the number of main contactors employed. This may reduce cost and complexity while maintaining durability of the high voltage bus disconnect circuit.

DETAILED DESCRIPTION

Figure 1:
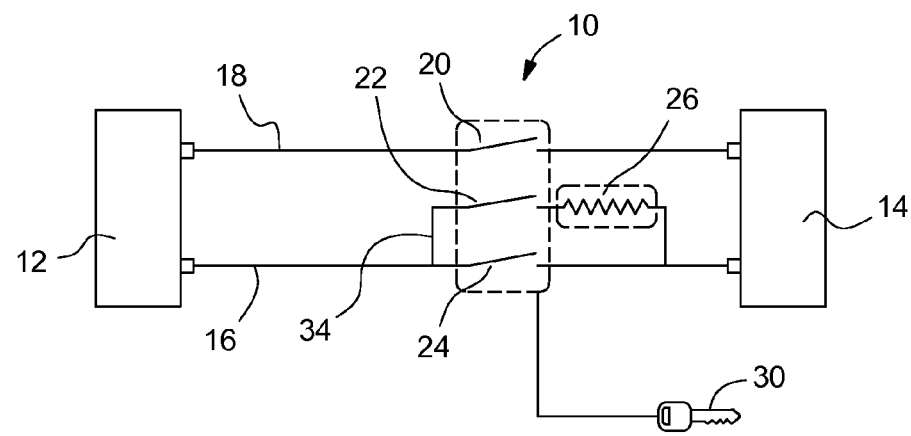
FIG. 1 is a schematic block diagram view of a high voltage bus disconnect circuit according to the prior art.

FIG. 1 illustrates a prior art high voltage disconnect circuit for an automotive vehicle, indicated generally at 10. A high voltage power source 12 is connected to a high voltage bus 14 by a first and second lead 16, 18, respectively. The high voltage power source 12 may be a battery. The first lead 16 has precharge and main contactors 22, 24, respectively, and the second lead 18 has an auxiliary contactor 20. The precharge and main contactors 22, 24 are wired in parallel. A precharge device 26 is located in a first branch 34 of the first lead 16.

The precharge device 26 reduces inrush current when the high voltage disconnect circuit is closed and may be any such suitable device known to those skilled in the art. The operation of the auxiliary, precharge, and main contactors 20, 22, 24 is controlled by a start signal 30. The start signal 30 is initiated by a vehicle driver and may be created by a mechanical ignition switch or an electronic start such as a push button or remote start.

The high voltage disconnect circuit energizes the high voltage bus 14 when, upon receipt of the start signal 30, the auxiliary contactor 20 closes, then the precharge contactor 22 closes, and finally the main contactor 24 closes. Upon completion of precharging, the precharge contactor 22 reopens and energization of the high voltage bus 14 is complete. The high voltage bus 14 is deenergized by opening, first, the main contactor 24 and then the auxiliary contactor 20.

Figure 2:
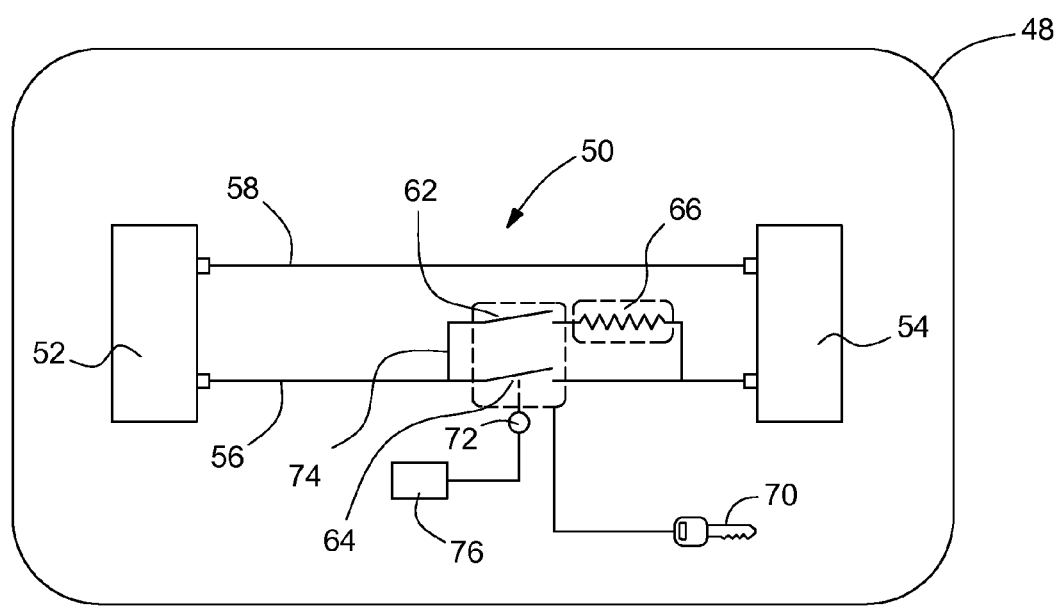
FIG. 2 is a schematic block diagram view of an embodiment of a high voltage bus disconnect circuit according to the present invention.

Referring now to FIG. 2, there is a high voltage disconnect circuit 50 for an automotive vehicle 48. The term high voltage as used herein means voltages in the range of about 150 volts and greater.

The high voltage disconnect circuit 50 includes a high voltage power source 52 connected to a high voltage bus 54 by first and second leads 56, 58, respectively. The high voltage power source 52 may be a battery. The first lead 56 has precharge and main contactors 62, 64, respectively. The second lead 58 is continuously electrically connected and uninterrupted between the high voltage power source 52 and the high voltage bus 54. Continuously electrically connected as used herein means that there is no contactor (switch) along the second lead 58 that can be automatically opened or closed during energizing or deenergizing the high voltage bus 54. Also, the term continuous second lead is continuously electrically connected between the power source 52 and the high voltage bus 54. For example, the second lead 58 may be a solid and unbroken wire. The precharge and main contactors 62, 64 are wired in parallel. A precharge device 66 is located with the precharge contactor 62 in a first branch 74 of the first lead 56.

The precharge device 66 reduces inrush current when the high voltage disconnect circuit is closed and may be any such suitable device known to those skilled in the art. The operation of the precharge and main contactors 62, 64 is controlled by a start signal 70. The start signal 70 is initiated by a vehicle driver and may be created by a mechanical ignition switch or an electronic start such as a push button or remote start. Alternatively, the precharge and main contactors 62, 64 may be closed by a vehicle management system to charge the battery or by the vehicle driver placing the mechanical ignition in a run or accessory position. The high voltage disconnect circuit 50 additionally includes a sensor 72 to measure the operating condition of, as well as wear and tear on, the main contactor 64. The sensor 72 provides data on the main contactor 64 to a battery control module 76. The battery control module 76 regulates and controls functioning of the battery and associated systems. This includes the battery control module 76 providing real time diagnostics as well as preserving the battery. The battery control module 76 may open and close the precharge and main contactors 62, 64 as well as diagnose wear and tear on the main contactors 64.

The operation of the high voltage disconnect circuit 50 will now be discussed. When energization of the high voltage bus 54 is initiated, only the precharge and main contactors 62, 64 are open in the high voltage disconnect circuit 50. Upon receipt of the start signal 70, a precharge contactor 62 closes. At this point, the high voltage disconnect circuit 50 is precharging. Upon completion of precharging, the main contactor 64 closes while the precharge contactor 62 remains closed. Once the main contactor 64 is closed, the precharge contactor 62 reopens and energization of the high voltage bus 54 by the high voltage disconnect circuit 50 is complete.

Precharging is complete when the voltage differential between the high voltage battery 52 and the high voltage bus 54 is within a particular range. The range of acceptable voltage differentials is dependent upon the amount of electrical arc the contactors are rated to receive without experiencing unacceptable wear. As understood by one skilled in the art, the higher rated the contactor in a high voltage circuit is, the less precharging the circuit requires. That is, the greater rated the contactor is, the higher the voltage differential between the high voltage source and the circuit may be at the end of precharging without the contactor experiencing unacceptable wear. Also, the longer the precharging time duration, the less the voltage differential will be at the end of precharging. Precharging of the single main contactor disconnect circuit 50 is, in general, for a longer time period than precharging of the prior art two contactor disconnect circuit 10, when the high voltage power sources 12, 52 have equal voltage potentials. As a non-limiting example, precharging of the disconnect circuit 50 is approximately 30% longer than precharging the prior art the disconnect circuit 10 when the high voltage power sources 12, 52 have equal voltage potentials.

The battery control module 76, using data provided by the sensor 72, diagnoses wear and tear on the main contactors 64. If the wear and tear exceeds a predetermined amount, then the battery control module 76 will make an appropriate response. For example, the battery control module 76 may diagnose that the main contactor 64 has become welded shut. In such a case, the battery control module 76 may allow the automotive vehicle 48 to be driven and shutoff, but not restarted. Alternatively, the battery control module 76 may diagnose that wear and tear of the precharge or main contactor is approaching a maximum threshold, at which point the battery control module may present an alert for the vehicle driver.

For vehicle shutdown, the high voltage bus 54 is deenergized by opening the main contactor 64 while the precharge contactor 62 remains open.

While certain embodiments of the present invention have been described in detail, those familiar with the art to which this invention relates will recognize various alternative designs and embodiments for practicing the invention as defined by the following claims.

What is claimed is:

1. A method of energizing an automotive vehicle high voltage bus, comprising:
   (a) closing a precharge contactor along a first lead between a high voltage power source and the bus, with a parallel main contactor being open, with a continuous second lead between the power source and the bus;
   (b) after (a), closing the main contactor while maintaining the precharge contactor closed;
   (c) after (b), maintaining the precharge contactor closed for a precharge duration;
   (d) after (c), opening the precharge contactor, while maintaining the main contactor closed.

2. The method of claim 1 wherein the bus is deenergized by, after (d), opening the main contactor.

3. The method of claim 1 wherein the precharging duration is a function of a voltage differential between the power source and the bus.

4. The method of claim 1 wherein the precharging duration is a predetermined time.

5. The method of claim 1 wherein a condition of the main contactor is monitored by a sensor, the sensor providing data on the condition of the main contactor to a battery control module.

6. The method of claim 5 wherein the battery control module provides real time diagnostics of the condition of the main contactor.

7. The method of claim 5 wherein the high voltage power source is a battery and the battery control module preserves a charge of the battery.

8. The method of claim 1 wherein the high voltage power source is a battery.

9. The method of claim 1 wherein the vehicle bus powers a traction motor to propel the automotive vehicle.

10. An automotive vehicle high voltage bus disconnect circuit, comprising:
    a high voltage power source;
    a vehicle electrical bus;
    a first lead between the power source and bus having a parallel precharge contactor and main contactor, wherein the precharge contactor is configured to close before the main contactor closes and the precharge contactor reopens after the main contactor closes;
    a continuous second lead between the power source and bus.

11. The circuit of claim 10 wherein the main contactor and the precharge contactor are both closed for a precharge duration.

12. The circuit of claim 11 wherein the precharge duration is a function of a voltage differential between the high voltage power source and the vehicle bus.

13. The circuit of claim 11 wherein the precharge duration is a predetermined time.

14. The circuit of claim 10 further comprising:
    a sensor monitoring a condition of the main contactor; and
    a battery control module processing data provided by the sensor.

15. The circuit of claim 14 wherein the battery control module provides real time diagnostics of the condition of the main contactor.

16. The circuit of claim 14 wherein the high voltage power source is a battery and the battery control module preserves a charge of the battery.

17. The circuit of claim 10 wherein the high voltage power source is a battery.

18. The circuit of claim 10 wherein the vehicle bus propels a traction motor to propel the automotive vehicle.

* * * * *